United States Patent [19]

Brun et al.

[11] 4,279,544
[45] Jul. 21, 1981

[54] HELICAL APPARATUS FOR COUPLING SUBMERGED PIPES

[75] Inventors: Andre G. Brun, Paris; Henri T. Dutilleul, Boulogne-Billancourt, both of France

[73] Assignee: Compagnie Francaise des Petroles, Paris, France

[21] Appl. No.: 87,858

[22] Filed: Oct. 24, 1979

Related U.S. Application Data

[63] Continuation of Ser. No. 868,243, Jan. 10, 1978, abandoned.

[30] Foreign Application Priority Data

Jan. 11, 1977 [FR] France ................................. 77 00628

[51] Int. Cl.³ ........................... E02B 17/00; F16L 1/04
[52] U.S. Cl. ...................................... 405/202; 166/346; 405/169; 405/171
[58] Field of Search ............... 405/169, 170, 171, 195, 405/202; 166/346, 350; 175/7

[56] References Cited

U.S. PATENT DOCUMENTS

| 3,346,045 | 10/1967 | Knapp et al. | 166/350 |
| 3,353,594 | 11/1967 | Lewis | 166/336 |
| 3,718,183 | 2/1973 | Scott | 166/346 X |
| 3,756,293 | 9/1973 | Adler | 405/202 X |
| 3,911,688 | 10/1975 | Behar et al. | 405/171 |
| 3,913,668 | 10/1975 | Todd et al. | 166/359 |
| 4,067,202 | 1/1978 | Reed | 405/195 |
| 4,075,862 | 2/1978 | Ames | 405/169 |

Primary Examiner—David H. Corbin
Attorney, Agent, or Firm—Sughrue, Rothwell, Mion, Zinn and Macpeak

[57] ABSTRACT

Connecting means for connecting the ends of at least a pair of pipes, said pipe ends being immersed in water and one of the or each pair of pipe ends being mounted on a fixed structure and connected, e.g. to an oil well, and the other of the or each pair of pipes being mounted on a movable structure, e.g. a column, mounted for oscillatory movement relative to the fixed structure, comprises in respect of the or each pair of pipes a tube of a length greater than the maximum distance between the pipe ends and in a spiral and/or helical shape, wherein the tube is supported intermediate the ends thereof solely by means for correcting the buoyancy thereof to reduce the buoyancy to substantially zero.

18 Claims, 16 Drawing Figures

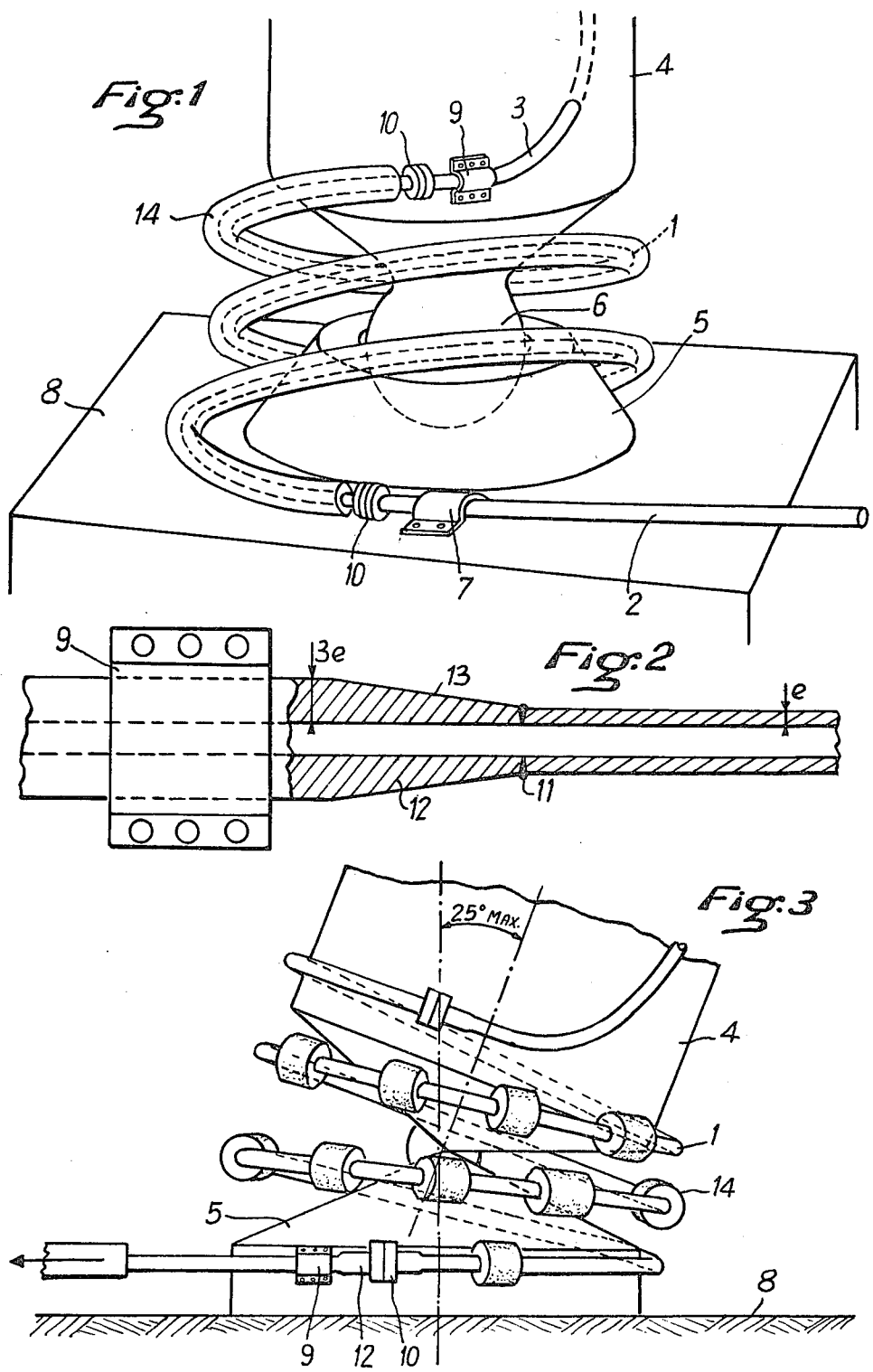

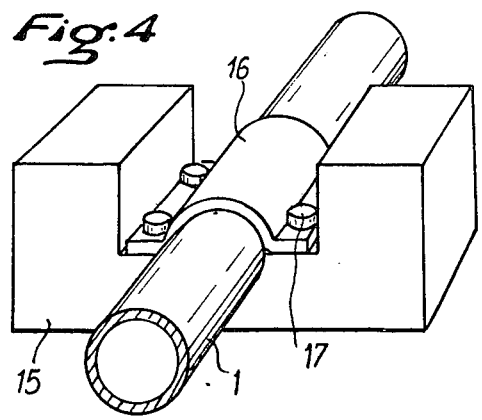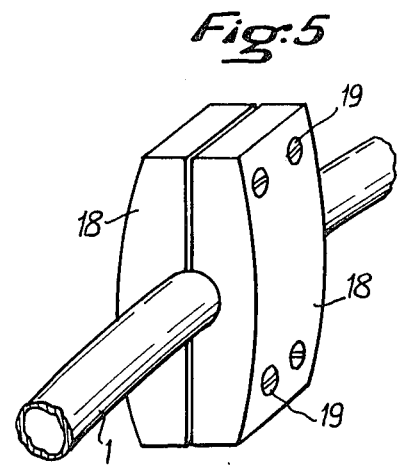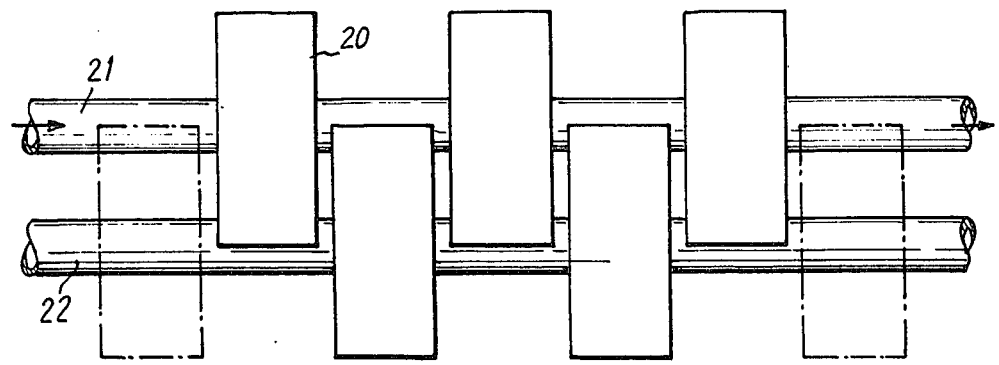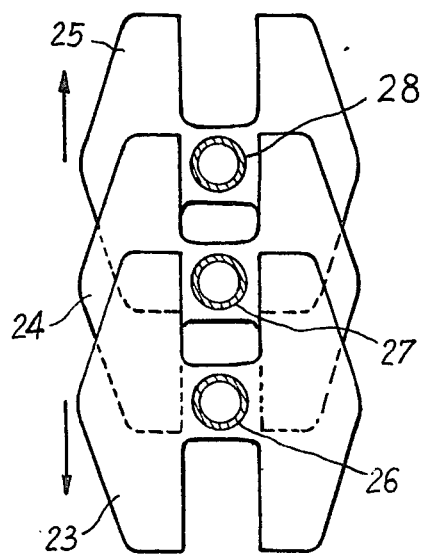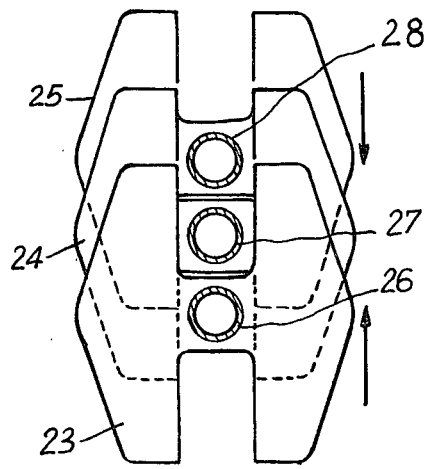

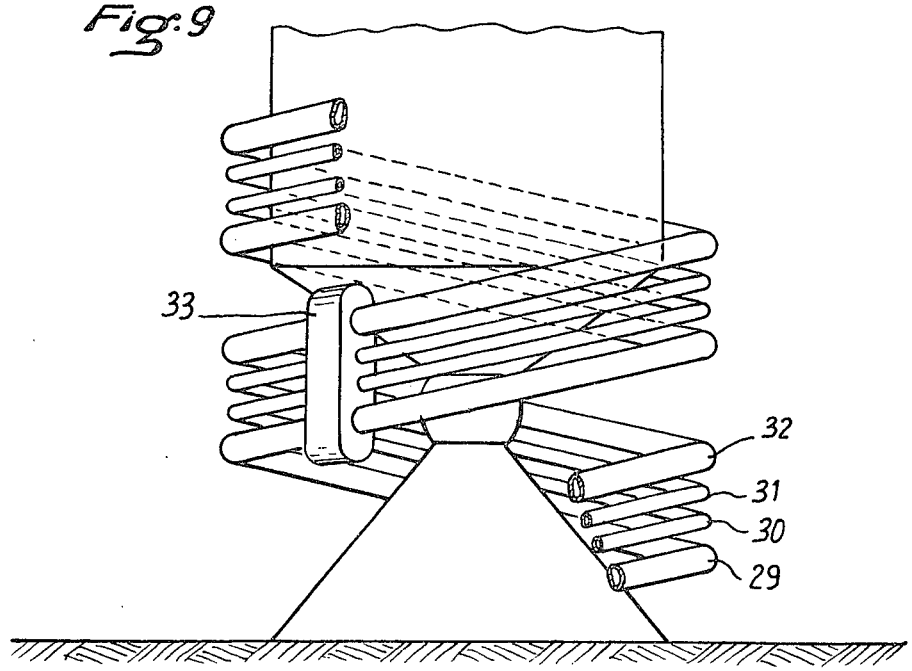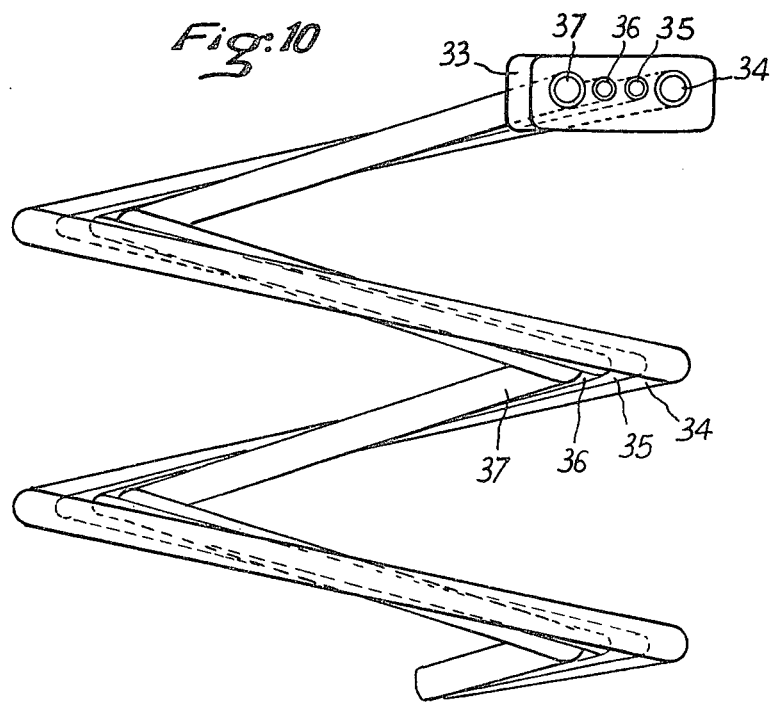

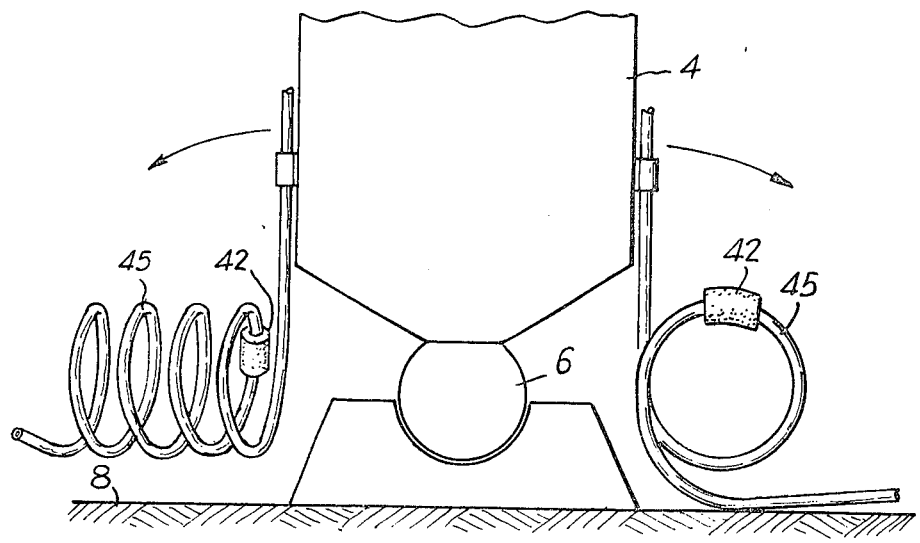
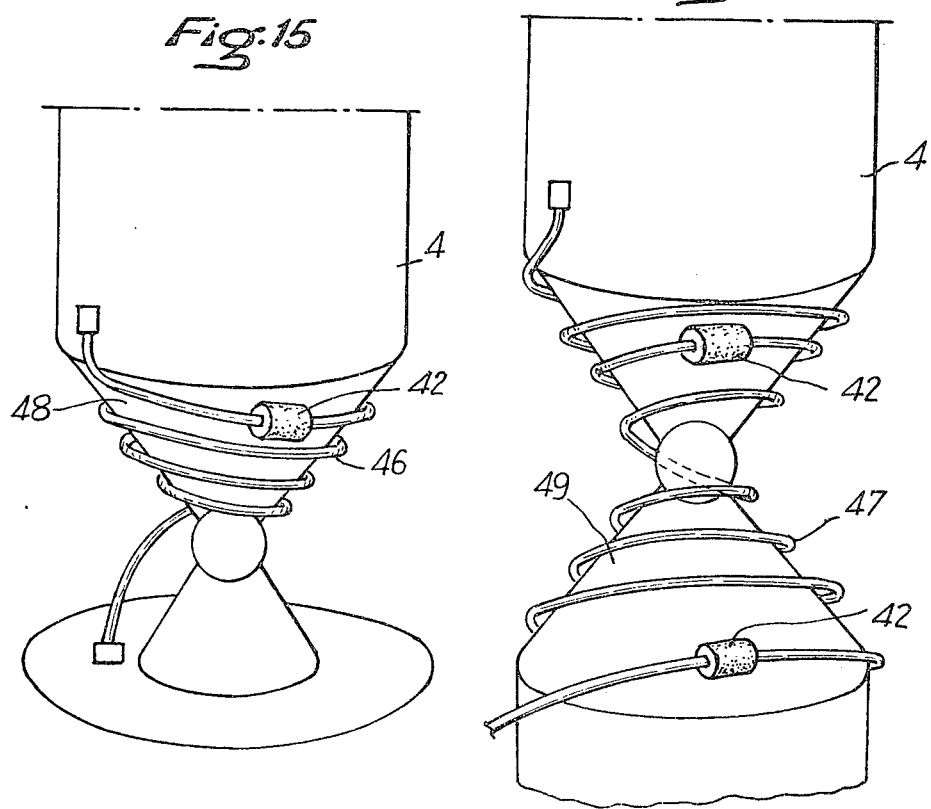

HELICAL APPARATUS FOR COUPLING SUBMERGED PIPES

This is a continuation of application Ser. No. 868,243, filed Jan. 10, 1978, now abandoned.

The invention relates to improvements in submerged pipes and particularly to means of connecting the ends of a pair of pipes of which one end is stationary and the other end is subject to repeated movements in variable directions and of variable amplitudes.

Connecting means of this kind are used particularly in piping the output from an underwater oil well to the surface. The single or each pipe connected to the well is connected to a pipe on a column, the column being articulated at its lower end. To permit movement of the column, the single or each pipe connected to the well can be made flexible and can be connected to the pipe on the column above the articulation on the column. However these flexible pipes are too weak to withstand the high pressures of the fluids which constitute the output from the well. Furthermore flexible pipes are poorly suited to scraping operations and are rather unreliable.

Another solution consists in reducing the cross sections of the pipes connected to the well and increasing their number so as to reduce the stresses due to alternating movements of the column whilst preserving the total flow rate. However it is then impossible to scrape the pipes because of their small diameters which means that the pipes have to be replaced periodically particularly because of the deposits left by the gas or oil.

According to one aspect of the present invention there is provided connecting means for connecting the ends of at least a pair of pipes, said pipe ends being immersed in water and relatively movable, said connecting means comprising, in respect to the pair or each pair of pipes, a tube of a length greater than the maximum distance between said pipe ends when in an extreme relative position, wherein said tube is supported intermediate the ends thereof solely by means for correcting the buoyancy thereof.

According to another aspect of the present invention there is provided connecting means for connecting the ends of at least a pair of pipes, said pipe ends being immersed in water, one of the pipes or each said pair of pipe ends being mounted on a fixed structure and the other of pipes the or each said pair of pipe ends being mounted on a movable structure mounted for oscillatory movement relative to said fixed structure, said connecting means comprising, in respect of the pair or each pair of pipes, a tube of a length greater than the maximum distance between said pipe ends, wherein said tube is supported intermediate the ends thereof solely by means for correcting the buoyancy thereof.

Preferably each tube has a spiral and/or helical shape. Thus where the movable structure is a column which is rotatable or pivotable about an articulation on said fixed structure, and each pipe is connected to a gas well, the stiffness of each tube resulting from the thickness of its walls, which is intended to resist the high pressures of the fluids to be conveyed thereby, as well as the size of its cross-section, which is such as to make it possible for a scraping tool to pass therethrough, are compensated by the increase in the length of the tube, the significant stresses resulting from the weight of the tube are compensated by the buoyancy correcting means, and the maximum stresses created by bending and twisting are reduced by the distribution of these stresses along the whole length of the tube.

In this way, it can be seen that the effects of fatigue on a tube undergoing repeated alternating stresses can be reduced below a given value by increasing the number of turns of the tube supported by the buoyancy correcting means which gives the tube zero or approximately zero buoyancy. In this way it is possible to avoid having to change the tube throughout the entire duration of the exploitation of the well, this being a result which could not be achieved by the former solution.

To prevent fatigue of a tube from occurring in the region of its connection to the pipes, the thickness of the tube wall at each end portion may be increased in the direction of the end of the tube.

The invention will be more fully understood from the following description of embodiments thereof, given by way of example only, with reference to the accompanying drawings.

In the drawings:

FIG. 1 is a schematic representation of an embodiment of connecting means according to the invention;

FIG. 2 shows the cross-section of the tube of the connecting means of FIG. 1 in the region of its connection to a pipe;

FIG. 3 is a schematic representation of another embodiment of a connecting means in an extreme position;

FIG. 4 shows an embodiment of an element of the buoyancy correcting means;

FIG. 5 shows another embodiment of an element of a buoyancy correcting means;

FIG. 6 shows an arrangement of elements of the buoyancy correcting means on two adjacent tube turns;

FIGS. 7 and 8 show the respective positions assumed by three pipe turns during relative movement of the pipes connected thereto;

FIG. 9 is a schematic representation of an arrangement of a group of tubes;

FIG. 10 is a schematic representation of another arrangement of a group of tubes;

FIGS. 11 to 14 show schematic representations of arrangements of single tubes; and FIGS. 15 and 16 show schematic representations of arrangements of a single tube associated with the lower end portion of a column.

Figure 11:
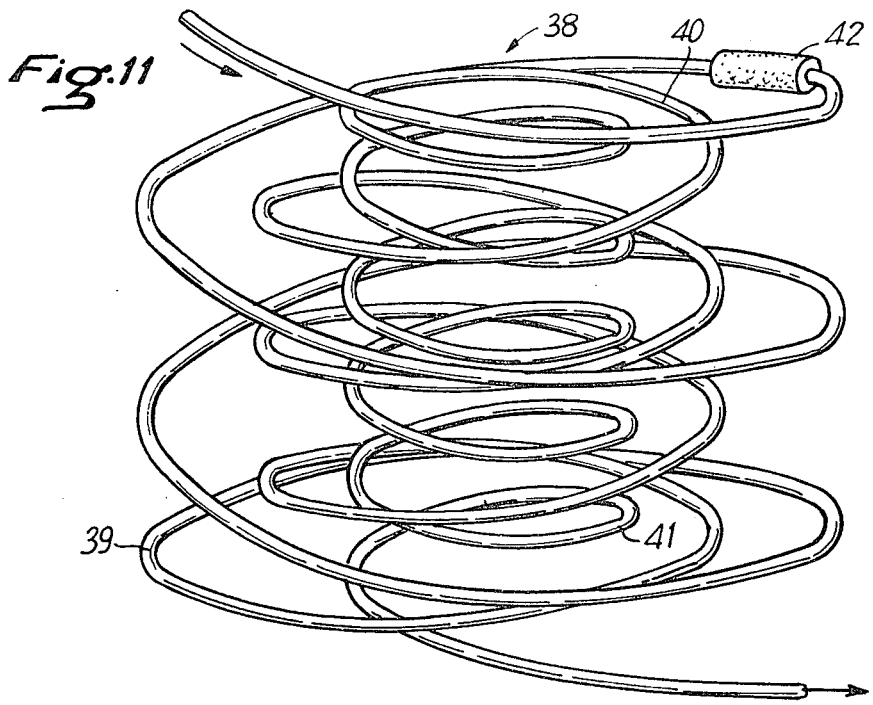

The connecting means shown in FIG. 1 comprises a connecting tube 1 which is wound in a helix and provided with means for correcting the buoyancy of the tube to provide the tube in use with substantially zero buoyancy. As shown the buoyancy correcting means comprises a continuous sheath 14. The tube 1 is connected to a fixed pipe 2 mounted on a fixed structure 8 and to a pipe 3 which is mounted on a column 4 articulated on a collar 5 by means of a swivel 6. Connectors 10 connecting the tube 1 to the pipes 2 and 3 can be of any type as can means 7 and 9 for fixing the tubes 2 and 3 respectively to the structure 8 and column 4, and have been illustrated by way of simple examples.

The connectors 10 can be replaced by simple welds as shown at 11 in FIG. 2. The thickness of the wall 12 of the pipe 3, as shown, (and correspondingly of pipe 2) in the region of the fixing means 9 (and correspondingly 7) increases uniformly away from the weld 11 until it reaches a thickness which is three times as large as the original thickness e. The slope of the outer surface 13, which as shown is of the order of 1/5, may vary from ½ to 1/10. If the connectors 10 of FIG. 1 are used instead of welding, parts having increasing thickness, such as 12 in FIG. 2, are welded to the ends of pipes 2 and 3 and to the ends of the tube 1.

The buoyancy correcting means may alternatively comprise a plurality of elements or floats 14 arranged on the helical tube 1 as shown in FIG. 3. These floats can be of any type, e.g. hollow or solid, and are made of any material which is resistant to attack by sea water and resistant to pressure. Although it is possible to use floats 14 which have cylindrical or helical shapes and through which there are tubular holes for the tube 1, floats which can be easily fixed to the tube 1 are preferably used, such as the floats shown in FIGS. 4 and 5. Float 15 of FIG. 4 is provided with a fixing piece 16 which is fixed to the body of the float, for example, by screws 17, and together with the body of the float surrounds the tube 1. The float of FIG. 5 comprises two identical parts 18 which are fixed together around the tube 1 by screws 19.

The floats are advantageously distributed along the tube 1 so that no one float interferes with the other floats of that tube or of other tubes, if more than one tube is provided. For example, as shown in FIG. 6 the floats 20 fitted onto two adjacent turns 21 and 22, of the same tube or of two different tubes, can be alternated so that none of the floats 20 on, for example, the tube turn 21 displaces the floats 20 on the other tube turn 22.

A distribution of this kind makes it possible, in particular, for the tube turns to move towards and away from each other, as shown in FIGS. 7 and 8, without interaction. In FIGS. 7 and 8 it is seen that the spacing between adjacent floats 23, 24 and 25, on each of the tube turns 26, 27 and 28, is greater than the length, measured along the tube turns, of each float, and makes it possible for each of the tube turns to move vertically or even to twist without disturbing the movement of the other turns. The height of the floats, measured in a direction parallel to the axis of the helix of the tube turns, is greater than the distance between two consecutive turns, ensuring that the distribution is maintained during relative movement of the tube turns.

As can be seen from FIGS. 4 to 8, the buoyancy correcting sheath or the separate buoyancy correcting floats can have any structure and be of any kind, and they can guide adjacent tube turns. Where a plurality of tubes are provided, as is the case in FIG. 9 where there are shown tubes 29, 30, 31 and 32, corresponding turns of the tubes can be combined together by buoyancy correcting floats, such as 33, the tube turns being distributed around the same cylinder. In FIG. 10 tubes 34 to 37 are distributed around concentric cylinders and combined by a float 33. The lower ends of the tubes, as well as those of the tubes in the preceding embodiments, can be connected to a manifold or similar device of an under-water well, and the upper ends can be connected to a corresponding number of pipes on the column 4.

When the connecting means must possess very high reliability, the tubes 38 may be shaped as shown in FIG. 11. The tubes 38 comprises a descending part 39 in the shape of a helix of large radius; the lower turn of this helix is connected to an ascending part 40 in the shape of a helix of smaller radius. The upper turn of this helix is connected to a descending part 41 in the shape of a helix of even smaller radius. Only one float 42 of the buoyancy correcting means has been shown in order not to overly complicate the figure.

Figure 12:
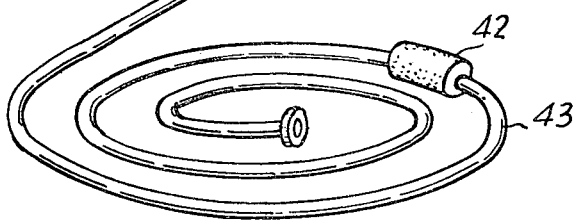
Figure 13:
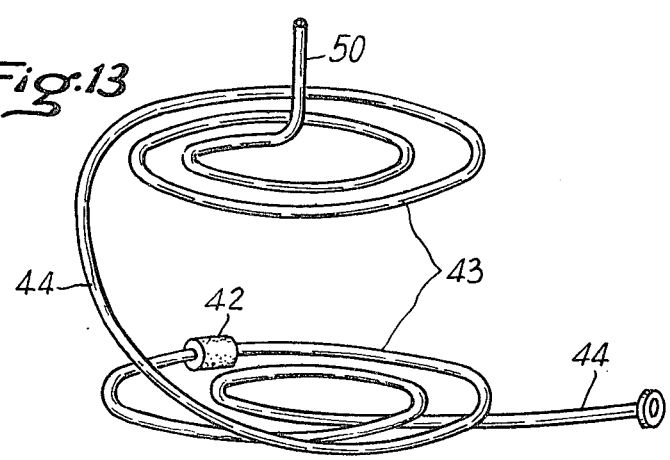

It may alternatively be desirable to give the tube a composite shape, as shown in FIGS. 12 and 13, in which the tube forms at least one spiral 43, the spiral ending in a helical part 44 or 50, the end of which is capable of moving vertically or horizontally.

The turns may alternatively be vertically extending as shown in FIG. 14, and are provided with a plurality of floats 42 or a continuous buoyancy correcting sheath. Only one float 42 has been shown on turn 45 but it will be appreciated that the other turns are also provided with similar buoyancy correcting floats.

FIGS. 15 and 16 illustrate two of many possible embodiments of the invention wherein the tube 46 in FIG. 15 and tube 47 in FIG. 16 is exactly fitted to the shapes of the parts 48 and 49 adjacent the articulation of the column 4.

Thus it is always possible to suitably associate a tube with a structure to be bridged by the tube. By varying the pitch of the helix or spiral of the tube and the number of turns, it is possible to prevent any obstacle to the movement of one turn relative to an adjacent turn in the case of maximum relative movement of the ends of the tube. It is possible to prevent any contact between the buoyancy correcting means of the turns of the same tube by increasing the diameter of the turns whilst reducing their number, this arrangement being applicable to groups of several tubes by using common buoyancy correcting means, whether the tubes are arranged as helices, as spirals or as any combination of these two shapes.

Furthermore, when turns are used which have a diameter greater than that of a column, it is possible to replace a damaged tube easily by withdrawing and replacing the tube by simply sliding it along the column.

It will be clear that a tube is given a helical and/or spiral shape which is appropriate to the movement to which the connecting means will be subjected, whereby the turns may or may not be distributed in a planar arrangement or as one or more groups having axes of any desired orientation and particularly as one or more groups having horizontal or vertical axes, the connectors at the ends of the tube similarly having any appropriate position and orientation. By way of example, the single or each tube may be shaped to increase its reliability, not only in respect of repeated oscillations of the column, but also in respect of alternating change of azimuth, as in the case of a charging operation at the surface.

It will be appreciated that, where the above described connecting means are for use in conveying the output of an oil well, each connecting tube has a wall thickness sufficient to resist high pressures of fluids to be conveyed thereby and a diameter sufficient to permit passage therethrough of a scraping tool.

What is claimed is:

1. Connecting means for connecting the ends of at least a pair of pipes, said pipes being immersed in water, one of the pipes having a pipe end being mounted on a movable column structure mounted on a fixed structure for oscillatory movement relative to said fixed structure, the other of said pipe ends connected to an underwater oil well, said connecting means comprising, in respect to said pair of pipes, a tube formed into a helix having a plurality of helical turns, said turns having a greater diameter than said movable column and a length greater than the maximum distance between said pipe ends, said tube surrounding the lower end of said movable column structure, said tube being connected to said pipe ends by detachable connectors to receive the output of said oil well, said tube having a wall thickness sufficient to resist the pressure of oil emerging from said well and a diameter sufficient to convey the oil well output, and buoyancy correcting means surrounding said tube and intermediate the ends thereof to provide said tube with substantially zero buoyancy.

2. Connecting means as claimed in claim 1, wherein said helix has a horizontal axis.

3. Connecting means as claimed in claim 1, wherein said turns of said tube form coaxial ascending and decending helices of different diameters.

4. Connecting means as claimed in claim 1, wherein said tube has the shape of at least one planar spiral.

5. Connecting means as claimed in claim 2, wherein said buoyancy correcting means is provided on each of said helical turns and said helical turns are spaced apart sufficiently to prevent contact between said buoyancy correcting means of each turn during relative movement of said pipe ends.

6. Connecting means as claimed in claim 1, wherein said buoyancy correcting means is in the form of a continuous sheath surrounding said tube.

7. Connecting means as claimed in claim 1, wherein said buoyancy correcting means is in the form of a plurality of spaced sheath sections surrounding said tube.

8. Connecting means as claimed in claim 1, wherein said buoyancy correcting means is in the form of a plurality of buoyancy correcting elements spaced apart along the length of each tube.

9. Connecting means as claimed in claim 8, wherein said buoyancy correcting elements are spaced apart along each tube to prevent contact therebetween during movement of said pipe ends.

10. Connecting means as claimed in claim 8, wherein the spacing between adjacent buoyancy correcting elements along said tube is greater than the length of each element in the longitudinal direction of said tube and the height of each element in a direction parallel to said tube turns is greater than the distance separating adjacent helical turns.

11. Connecting means as claimed in claim 1, including a plurality of tubes, wherein at least some of said tubes are grouped together by said means for correcting the buoyancy thereof.

12. Connecting means as claimed in claim 11, wherein said buoyancy correcting means comprises a body surrounding said group of tubes.

13. Connecting means as claimed in claim 1, wherein at each end portion of each tube, the thickness of the wall thereof increases towards the end thereof, the slope of the wall of each said end portion being between $\frac{1}{2}$ and 1/10.

14. Connecting means as claimed in claim 1, wherein said lower end portion of said column is generally frustoconical and each tube is shaped to said lower end portion of said column.

15. Connecting means as claimed in claim 1, comprising a plurality of tubes, the tubes being arranged in a plurality of helices around said lower end portion of said column.

16. Connecting means as claimed in claim 14, wherein the various helices of said plurality of helical turns have different diameters and corresponding turns of said helices are aligned in a direction normal to the axis of said column.

17. Connecting means as claimed in claim 14, wherein various helices of said plurality of helical turns and corresponding turns of adjacent helices have the same diameter.

18. Connecting means as claimed in claim 1, wherein each helix has a vertical axis.

* * * * *